United States Patent [19]
Triller et al.

[11] 3,726,596
[45] Apr. 10, 1973

[54] OPTICAL DEVICE FOR FORMING MEASURING AND REFERENCE BEAMS OF LIGHT

[75] Inventors: Adolf Triller; Wolfgang Siersch, both of Munich, Germany

[73] Assignee: Erwin Sick, Waldkirch, An der Allee, Germany

[22] Filed: Aug. 5, 1971

[21] Appl. No.: 176,380

[30] Foreign Application Priority Data

Aug. 11, 1970 Germany..................P 20 39 827.0

[52] U.S. Cl. ..................356/213, 356/229, 356/206
[51] Int. Cl.............................G01j 1/00, G01j 1/10
[58] Field of Search......................356/195, 204, 205, 356/206, 213, 212; 250/218

[56] References Cited
UNITED STATES PATENTS 3,617,756  11/1971  Sick...............................356/205 X

OTHER PUBLICATIONS

"Digital Tranducer for Petroleum Explanation," Sanders, IBM Tech. Disclosure Bull. Vol. 10 No. 5.

Primary Examiner—Ronald L. Wibert
Assistant Examiner—Conrad Clark
Attorney—Darbo, Robertson & Vandenburgh

[57] ABSTRACT

A beam from a light source is collimated and directed at right angles into the input face of a Koster's prism. From the output face of the prism emerge a measuring and reference beams which are parallel to each other. Lenses across the latter beams focussing the respective beams in the plane of a chopper disc. Diaphragms are positioned between the lenses and the disc.

6 Claims, 1 Drawing Figure

PATENTED APR 10 1973  3,726,596
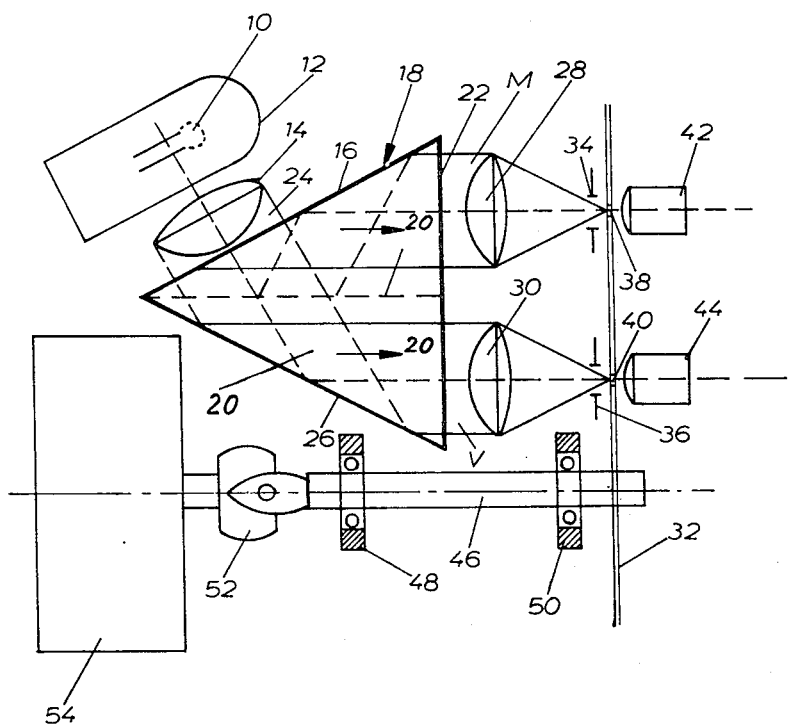
ADOLF TRILLER
WOLFGANG SIERSCH
INVENTORS
BY
Darbo, Robertson &
Vandenburgh

OPTICAL DEVICE FOR FORMING MEASURING AND REFERENCE BEAMS OF LIGHT

BACKGROUND AND SUMMARY OF THE INVENTION

This invention relates to an optical device for forming measuring and reference beams of light in a double beam instrument which instrument responds to the ratio of the beam intensities, said measuring and reference beams of light being formed by means of partially transparent surfaces from one single beam of light emanating from an interchangeably mounted light source.

In a prior art optical double beam instrument a collimated beam of light is formed by means of a first lens from the light emitted by a lamp filament. A semitransparent mirror is located in this beam at an angle of 45° with respect to the beams's axis. The semitransparent mirror splits the beam into a transmitted measuring beam and a reflected reference beam. A second lens is positioned in the path of rays of the measuring beam and serves to focus the beam substantially in the plane of an aperture disc. The reference beam is deflected through 90° a second time by another deflecting mirror so that it travels parallel to the measuring beam. A third lens in the path of the reference beam also produces an image of the filament substantially in the plane of the aperture disc. See Swiss Pat. No. 490,683. In this prior art device, the optical path lengths in the path of rays of the measuring beam and of the reference beam are different. Therefore, it is necessary to adjust the lamp very accurately, since differences in the position of the lamp filament (such as those easily occurring upon interchanging of lamps) affect the beam intensities in the measuring beam and in the reference beam in different ways.

So-called "Koster's prisms" are known for beam splitting purposes. These prisms have an equilateral triangular cross section. An internal semitransparent separating surface extends at a right angle to one external surface (the output face) of the Koster's prism. A light beam falling on a side surface (the input face) of the prism substantially at a right angle thereto will be partially reflected and partially transmitted by said separating surface. This partially reflected light beam is returned to the side surface through which it has entered and will be totally reflected by that side surface. The partial beam transmitted through the separating surface will be totally reflected by the other side surface of the prism. Both beams leave the prism through the output face (which is at a right angle to the separating surface), the two beams then being parallel to each other and symmetrical with respect to said separating surface. Such prisms have, in particular, been used for interferometric distance measurements. See the books "ABC der Optik", Verlag Werner Dausin, Hanau, 1961, page 399; and "Technische Optik" by Fritz Hodam, VEB Verlag Technik, page 256.

It is an object of the invention to provide an optical device for forming measuring and reference beams in a double beam instrument responding to the ratio of the beam intensities, wherein the intensities of the two beams are equal independent of the lamp mounting and of changes of the luminosity curve and wherein the ratio of the non-attenuated beam intensities cannot be influenced by slight changes of the location of the light source. In accordance with the invention, this is achieved by a device of the type mentioned in the beginning, wherein the primary beam from the light source is split into said measuring and reference beams by a Koster's prism and wherein pairs of identical optical elements and/or diaphragms are located in the paths of the measuring and reference beams, respectively, at equal optical path lengths from said light source.

In such a device one beam of light is reflected twice, namely once by the semitransparent separating surface and secondly by the entrance surface of the prism. The other beam is subjected to one reflection only. Thus one light source image is upside down with respect to the other. With a change of the location of the light source and/or the angle of incidence of the primary light beam, the two output beams are displaced in opposite directions so that due to this displacement exactly corresponding portions of the light source images would be cut off say by a diaphragm or a lens holder in each beam, as corresponding diaphragms or optical elements are provided at equal optical path lengths from the light source.

There is a preferred embodiment of the invention, wherein a converging optical element is located across the primary beam between light source and Koster's prism, said converging optical element directing a parallel beam of light substantially at right angles onto one side surface of said Koster's prism, wherein identical converging optical elements for the measuring and reference beams respectively are located at equal distances from the exit side surface of said Koster's prism, said latter converging optical elements focussing the two beams substantially in the plane of a chopper disc, and wherein said chopper disc has two circular arrays of apertures for modulating the measuring and reference beams in different manners, the diameters of said apertures in the two circular arrays being identical.

DESCRIPTION OF THE DRAWING

The drawing shows a side elevation of an embodiment of the invention.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

The light source is the filament 10 of a lamp 12. The lamp 12 is interchangeably mounted in conventional manner (not shown). A primary light beam emanating from the filament 10 is collimated by a converging optical element 14 and falls on the input side surface or face 16 of a Koster's prism 18 substantially at a right angle thereto. The Koster's prism has an equilateral triangular cross section and is provided with a semitransparent, semireflecting separating surface 20 which is at right angles to the output side surface or face 22. The incident collimated beam 24 is partially reflected by the separating surface 20 and that part is returned to the input surface 16. That partial beam is then totally reflected by the input surface 16, so that it leaves the prism parallel to the separating surface 20 and at right angles to the output surface 22. The partial beam which passes through the separating surface 20 is totally reflected by the third side surface 26 of the prism and leaves the prism 18 also parallel to the separating surface 20 and at right angles to the output surface 22. It will be noted that the path of rays of the two partial beams is completely symmetrical with respect to separating surface 20 so that the two beams, measuring beam M and reference beam V, travel through equal optical path lengths until they leave the prism at output surface 22 and that the two output beams M and V are parallel to each other. Identical converging optical elements 28 and 30 for the measuring and reference beams M and V, respectively, are located at equal distances from the surface 22. These optical elements focus the beams substantially in the plane of an aperture disc 32. Actually images of the light source are formed in the plane of a pair of diaphragms 34, 36 which are arranged immediately in front of the aperture disc. By these diaphragms, which act as field stops, only the hot central portion of the filament is used as an effective light source. The aperture disc is provided with two circular arrays of apertures 38, 40, by which the measuring beam M and the reference beam V, respectively, are modulated at different frequencies (or phases). It is important that the two circular arrays of apertures comprise apertures of exactly identical diameters for both arrays. The aperture disc 32 is mounted on a shaft 46 for rotation about the axis thereof. The shaft is journalled in bearings 48, 50 in a casing (not shown). It is driven through a universal joint 52 by a disc shaped motor 54.

Micro-objectives 42 and 44 are arranged behind the aperture disc, again at equal optical path lengths therefrom. The further path of rays can, for example, be similar to that shown in Swiss Pat. No. 490,683 (U.S. application Ser. No. 809,598 by Erwin Sick, filed March 21. 1969).

We claim:

1. In a double beam instrument responding to the ratio of intensities of a measuring light beam as compared to a reference light beam, said instrument having an optical apparatus for forming the measuring and reference beams, comprising an interchangeably mounted light source for producing a primary beam of light and means for dividing said primary beam into said measuring and reference beams, the improvement comprising:
    said means being a Koster's prism having an input face positioned to receive said primary beam and an output face at which said measuring and reference beams emerge in parallel alignment to each other; and
    two identical optical devices positioned respectively across said reference and measuring beams at equal distances from said output face and thus at equal optical path lengths from said light source.

2. In an instrument as set forth in claim 1, including a converging optical element means positioned across said primary beam between said light source and said input face for collimating the primary beam entering said input face and directing the collimated beam at right angles to said input face.

3. In an instrument as set forth in claim 2, including a chopper disc positioned in a plane and rotating about an axis, said optical devices each comprising an optical element focussing the respective beam substantially in said plane and at different radial distances from said axis, said disc having two circular arrays of apertures positioned respectively at said different radial distances from said axis, the apertures of each array being identical in diameter.

4. In an instrument as set forth in claim 3, wherein said optical devices each include a diaphragm across the measuring and reference beams respectively for reducing the peripheral size of the beam.

5. In an instrument as set forth in claim 1, including a chopper disc positioned in a plane and rotating about an axis, said optical devices each comprising an optical element focussing the respective beam substantially in said plane and at different radial distances from said axis, said disc having two circular arrays of apertures positioned respectively at said different radial distances from said axis, the apertures of each array being identical in diameter.

6. In an instrument as set forth in claim 5, wherein said optical devices each include a diaphragm across the measuring and reference beams respectively for reducing the peripheral size of the beam.

* * * * *